US005096008A

United States Patent [19]

Mankowski

[11] Patent Number: 5,096,008

[45] Date of Patent: Mar. 17, 1992

[54] STAND-UP WHEELCHAIR

[75] Inventor: John P. Mankowski, Detroit, Mich.

[73] Assignee: Jericho Corporation, Detroit, Mich.

[21] Appl. No.: 587,257

[22] Filed: Sep. 24, 1990

[51] Int. Cl.[5] .............................................. B62D 11/04

[52] U.S. Cl. .................................... 180/6.5; 180/65.1; 180/907; 297/DIG. 4; 297/DIG. 10; 414/921

[58] Field of Search .................... 180/DIG. 907, 65.1, 180/6.5, 216; 280/304.1, 250.1; 297/DIG. 4, DIG. 10; 5/63, 64, 65; 414/921

[56] References Cited

U.S. PATENT DOCUMENTS

| | | | |
|---|---|---|---|
| 4,456,086 | 6/1984 | Wier et al. | 180/907 X |
| 4,569,556 | 2/1986 | Pillot | 297/DIG. 10 |
| 4,951,766 | 8/1990 | Basedow et al. | 180/907 X |

FOREIGN PATENT DOCUMENTS

| | | | |
|---|---|---|---|
| 82/01313 | 4/1982 | PCT Int'l Appl. | 297/DIG. 4 |
| 0776610 | 11/1980 | U.S.S.R. | 414/921 |
| 2017014 | 10/1979 | United Kingdom | 414/921 |
| 2109321 | 6/1983 | United Kingdom | 180/907 |

OTHER PUBLICATIONS

U. S. Department of Commerce, "Wanted-A Stair--Climbing Wheel Chair," Jan. 1962, p. 31.

*Primary Examiner*—Andres Kashnikow
*Assistant Examiner*—Brian L. Johnson
*Attorney, Agent, or Firm*—Lynn E. Cargill

[57] ABSTRACT

A rotatable stand-up wheelchair or invalid mobility device which includes a main drive chassis having front and rear wheels. A means for raising and lowering the seat and back portion of the wheelchair raises and lowers the invalid from a substantially seated position on the seat to a substantially standing position supported by a foot plate attached to the base of the wheelchair. Stability of the wheelchair device is maintained by two triangular wheel configurations intercepting at their apex. In operation, the invalid can move while standing in such a fashion as the foot plate may be lowered to a close proximity to the ground so that the invalids hand approximates the level of a hand height of a non-handicapped person. This simulated normal motion and enables direct contact with countertops and other work surfaces.

11 Claims, 2 Drawing Sheets

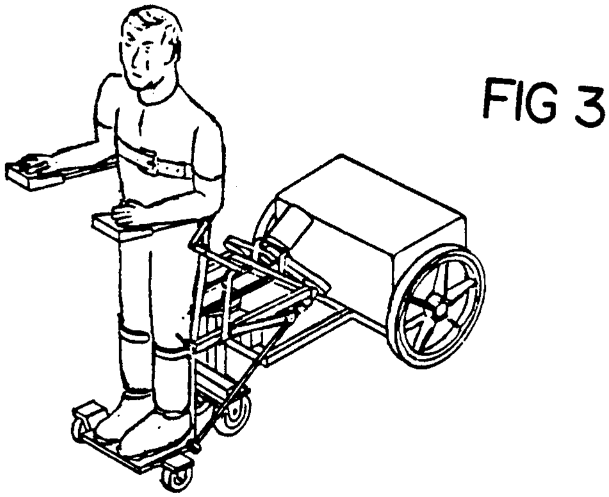
FIG 3
FIG 4
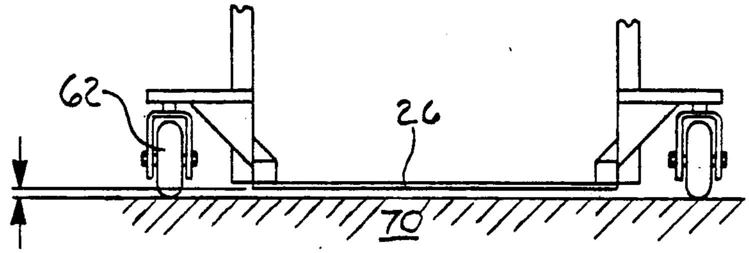
FIG 5
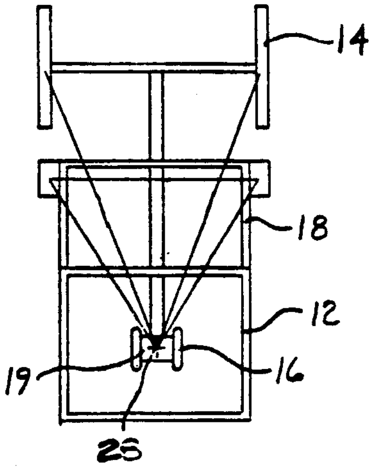
FIG 6
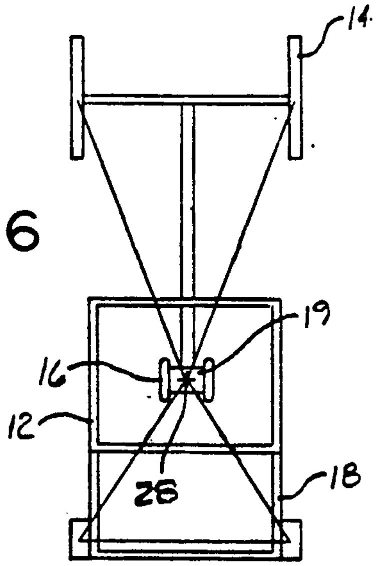

STAND-UP WHEELCHAIR

TECHNICAL FIELD

This invention relates generally to wheelchairs, but more particularly relates to a stand-up wheelchair.

BACKGROUND OF THE INVENTION

Traditionally, wheelchairs to mobility devices have been used to aid in the transportation of invalids. Government statistics now show that one in every two hundred people is confined to a wheelchair. The conventional wheelchair devices have experienced problems due to neck pain from looking upward, bowel and bladder problems from remaining in a persistent seating position and other general heath problems due to lack of circulation, etc. It has long been known to provide wheelchairs which are mechanized to the extent of being convertible from a sitting position to a standing position. However, wheelchairs of that type have generally not be suited for mobility, because powered propulsion equipment has created a risk factor, as well as providing a mobility device which cannot get close enough to countertops, nor can the wheelchair extend underneath the kick plates located in almost every kitchen or bathroom.

A study of the anthropometric average of all humans has led to a standard table height of about 29 inches. Whether a person is 7′ tall, or 4′6″, their fingertips generally are suspended about 29″ above the ground. Furthermore, a standard reach has been adjusted for faucets and other such items, requiring a 4″ indentation underneath sinks, known as kick plates. If the body of the invalid on a stand-up wheelchair as closed in the prior art is raised up from several inches to about 10″ off the ground, the anthropometric average has been disturbed, and the fingertips of the person will not be able to reach the countertop. In addition, if the stand-up portion of the wheelchair does not fit underneath the kick plate next to kitchen and bathroom faucet and sinks, the invalid will generally not be able to reach the faucets and the backs of countertops of their non-invalid brethren. Therefore, it would be a great advantage to provide a stand-up wheelchair which would allow for the invalid to be in a standing position while also being able to be extremely close to the ground so as not to effect the anthropometric averages which are inherent in the body build and shape of the invalid.

Prior art mobility devices were inherently unstable because most of the weight would be placed on the front of the wheelchair when the patient or invalid was in the standing position, rendering the device unstable. It would also be of great advantage to provide a stand-up wheelchair, which would provide stability for the person operating the wheelchair, or for the invalid standing in the wheelchair.

Other stand-up wheelchairs have been manufactured which can stand the invalid in an upright position, but cannot get close enough to faucets and sinks, nor are they rotatable in a very small diameter, such as for example, to be able to rotate 180° in a doorway. In addition, other chairs and stand-up wheelchairs must be at least 4″ off ground over a 30″ wheel base to clear a maximum of a 28° incline such as are designed in handicap ramps. Without a platform that can raise and lower itself, the wheelchair or invalid mobility device would not be able to be usable on a handicap ramp while in a standing position. Again, the anthropometric averages of most human beings are between 28 to 32 inches. The designs of all standing household devices relate to these averages so that normally sized human beings are able to use countertops and drawers. If the human is in a standing up position, and they are in a stand-up wheelchair which places the entire body anywhere from 4 to 10 inches from the ground, and the invalid can't bend over, they would not be able to use normal work surfaces such as faucets, or to pick-up a screw driver from a work surface. In order to help invalids return to a normal working environment, they must be able to simulate normal mobility and height standards in order to be able to compete with their non-invalid counterparts. Every counter and cupboard has a 2 to 4 inch kick plate recessed area underneath which brings us closer to faucets etc. If the platform underneath the stand-up wheelchair keeps one approximately 4 inches away from the counter because it will not fit underneath the kick plate, combining that with removing the 2 to 4 inches under the kick plate, the invalid actually is an additional 7 inches away from a faucet. If the invalid cannot bend over in order to compensate for that additional distance which needs to be travelled, the invalid cannot touch nor reach the faucets or cupboards or other items. Average leg, arm and torso lengths of all human beings have determined the anthropometric average of 30″ for a table height, and a 20″ depth generally for countertop and kitchen and bathroom sinks. It is for these reasons that the prior art stand-up wheelchairs have not been able to function well within a home or a work place setting. Patents on prior art devices which will be discussed below can be readily seen to conflict with these requirements for simulated normal mobility of an invalid within a home or work place. Attempts to produce stand-up wheelchairs which are mobile have met with failure because platforms upon which the invalid stood did not allow for a lower clearance to the ground in order to maintain the anthropometric averages. Examples of previous attempts to solve these problems are described in the following patents. U.S. Pat. No. 3,907,051 issued Sept. 23, 1975 to Weant et al. discloses a stand-up wheelchair which includes a motor-operated means for raising and lowering a partially paralyzed person from a seated to a substantially standing position. Once the invalid is standing, it appears that stability would be compromised due to the large wheels and the fact that the platform does not apparently touch the ground.

U.S. Pat. No. 3,964,786 issued June 22, 1976 to Mashuda discloses a wheelchair in which the seat, back and leg portions are so articulated and separately actuable, by power means, under control of the occupant, as to enable the occupant to assume any of one of three positions, either sitting, standing or reclining. From the figures and description, it does not appear that the anthropometric averages would be maintained.

U.S. Pat. No. 4,119,164 issued Oct. 10, 1978 to Fogg, Jr. et al. discloses a wheelchair designed to enable an invalid to stand to perform useful work and to move about. However, again, it does not appear that a platform as shown in the figures and described in the description would maintain the anthropometric averages necessary for simulated normal movement.

U.S. Pat. No. 4,155,416 issued May 22, 1979 to Ausmus discloses an occupant-operated motorized vehicle for supporting paraplegics in a standing position for working with their hands. Again, the platform means upon which the invalid will stand appears to alter the height of the invalid, thereby changing the anthropometric averages.

U.S. Pat. No. 4,390,076 issued June 28, 1983 to Wier et al. discloses an integrated ambulator and wheelchair to enable a paraplegic to stand on the ambulator and be separated from the wheelchair for maneuvering in confined spaces Although the separate ambulator would be able to allow the invalid to move freely within a space, the platform attached thereto would change the anthropometric average.

U.S. Pat. No. 4,437,537 issued March 20, 1984 to Ausmus describes an occupant operated motor driven vehicle for supporting handicapped occupants adapted to be tilted forward by the occupant for retrieving articles lying on the vehicle's support surface, and to be restored to vertical operating position. The platform means does not appear to be integrated into any sort of wheelchair, nor does it appear to maintain anthropometric averages.

U.S. Pat. No. 4,456,086 issued June 26, 1984 to Wier et al. discloses an integrated wheelchair and ambulator which allows a paraplegic to stand, although it contains a platform which is undesirable in order to maintain anthropometric averages. Therefore, it is a primary object of the present invention to provide an invalid mobility device or stand-up wheelchair in accordance with the present invention which is capable of allowing an invalid to stand, while maintaining the anthropometric averages to allow the invalid to experience approximate normal motion and simulated normal activities and mobility but will allow routine functions to be performed like non-invalid counterparts.

It is yet another object of the present invention to provide an invalid mobility device which includes tripod stability for enhanced rotation capabilities to further aid in simulating normal motion and maneuver ability in tight quarters.

SUMMARY OF THE INVENTION

In accordance with a preferred embodiment of the present invention, these and other objects and advantages are addressed as follows:

A stand-up wheelchair or invalid mobility device including a main drive chassis having front and rear wheels and a main chassis axis of rotation which includes an ambulator assembly which is rotatably attached to the chassis. The ambulator assembly includes an invalid supporting means with a seat which is pivotally mounted to the ambulator assembly, a back portion pivotally mounted to said seat, and a footplate attached to the ambulator assembly for receiving the feet of the invalid. The ambulator assembly has an axis of rotation about which the assembly rotates.

Also included is a means for raising and lowering the seat and back portion to thereby raise and lower the invalid from a substantially seated position on the seat to a substantially standing position supported by the footplate. The invalid is clamped against the seat and back portion of the invalid supporting means attached to the mobility device for supporting the invalid in the mobility device.

A motor or other means for driving the wheels of the mobility device is directed by a steering means for said mobility device in communication with the wheels and a joy stick or other means is attached to the mobility device within reach of the invalid for controlling the speed and direction of movement of the chassis and the ambulator assembly.

A rotation means rotates the ambulator assembly around the ambulator assembly axis of rotation in a path extending around a part of the outer circumference of the chassis to place the invalid within easy reach of countertops and work surfaces so that the invalid may stand without a barrier between his body and a countertop or other surface.

So that the invalid can move while standing, at least one caster is attached to the bottom of the footplate so that the footplate may be supported on and movable over the ground by the at least one caster, the footplate and caster being designed so that the footplate may be lowered to a close proximity to the ground so that the invalid's hand reach is at a level to enable direct contact with countertops and other work surfaces.

The present invention may be described as basically including interlocking triangles which provide some tripod stability for the invalid while standing. The seat may be rotated and the platform upon which the invalid's feet are placed may be dropped in order to maintain the anthropometric average of the occupant. The first triangle of the interlocking triangle design is the main chassis which is essentially formed by two large wheels in the front, and at least one wheel in the back forming the apex of the triangle. The second triangle of the interlocking triangle is defined by the ambulator assembly which includes two wheels alongside the standing platform, while the apex of this triangle is the connection point and pivot attached to the main chassis.

The wheelchair may be motorized, or it may be mechanically operated, both in the drive directions and for raising and lowering the seat, or invalid supporting means in the ambulator assembly.

BRIEF DESCRIPTION OF THE DRAWINGS

Other objects, features and advantages of the present invention will become apparent upon consideration of the specification and the appendant drawings, in which:

FIGURE shows a perspective view of the inventive device constructed in accordance with the present invention, wherein the wheelchair is shown in a sitting position;

FIG. 3 shows the wheelchair in a full standing position including an occupant, illustrating the ambulator assembly in position which is 180° away from the position of the ambulator when it is in the seated position;

FIG. 4 is a front view of the platform portion of the ambulator assembly showing the close proximity of the platform to the ground;

FIG. 5 illustrates the interlocking triangle configuration of the main chassis in relation to the ambulator assembly; and FIG. 6 shows the interlocking triangle configuration of the main chassis and ambulator assembly when the ambulator assembly has been rotated around to be 180° from the main chassis.

DETAILED DESCRIPTION OF THE INVENTION

Figure 1:
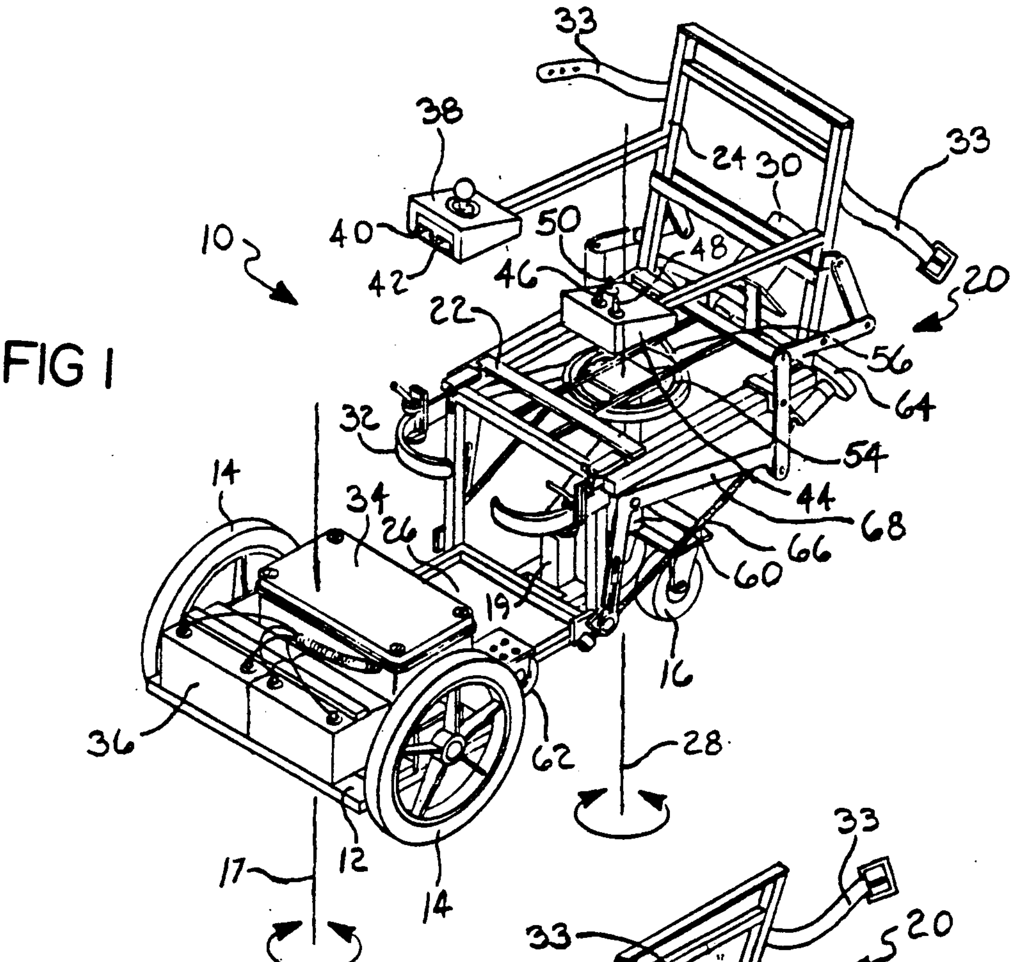

With combined reference to all the Figures, a stand-up wheelchair, or invalid mobility device, is generally denoted by the numeral 10. The stand-up wheelchair includes a main drive chassis 12 supported by front wheels 14 and rear casters 16. The main chassis has an axis of rotation 17 which is approximately half way between the front wheels of the main drive chassis. Upon the main drive chassis 12, an ambulator assembly 18 includes an ambulator frame support 19 which extends upwardly from the rear portion of the main drive chassis and supports the invalid supporting means 20. The invalid supporting means 20 generally consists of a seat 22, a back portion 24, and a foot plate 26. The ambulator assembly also has an axis of rotation 28. A means for raising and lowering the seat is generally shown by a motor 30, which is the ambulator leverage drive motor. This motor may preferably be a one and one-half horse power dc in—dc out motor. Motor 30 acts to raise and lower the ambulator portion 18 in order to make the wheelchair stand-up. A clamping means 32 is shown for lower lumbar supports The clamping means 32 are generally designed to support underneath the knees of the occupant of the wheelchair. Furthermore, an upper body strap support 33 is included for supporting the chest and upper body portion of the occupant.

In order to move the wheelchair, the preferred embodiment includes a means 34 for driving the wheelchair, although the wheelchair may be of a mechanically operated configuration. Most preferably, the wheelchair includes at least one and 1½-half horse power dc in—dc out motor located between the front wheels for a transversely mounted motorized situation. Batteries 36 are generally gel cell batteries, rather than acid type batteries so that they are rechargeable, and are less likely to blow-up.

Steering means 38 is a drive chassis control box, and is preferably of a joy stick type configuration. High-low switch 40 regulates the speed of the motor for traveling, and on/off switch 42 is generally included for operating the entire device. Control means 44 is located on the opposite arm and is an ambulator control box. An up/-down switch 46 is located next to rotation switch 48 and ambulator assembly lifter 50 to control motor 60 for dropping the ambulator. The ambulator control box essentially controls all the others functions performed by this device. Further included is an ambulator rotation motor 52 which is attached to seat support rotation gear 54 and drive belt 56. When activated, rotation motor 52 moves the drive gear 58, and then consequently drive belt 56 which moves seat support rotation gear 54, and rotates the entire ambulator assembly so that the seat can be utilized in any circumferential position around the axis of rotation 28 of the ambulator assembly.

In the process of rotating the seat, seat lift motor 60, which may generally be a subfractional horse power rating, acts to drop the seat once the seat has been rotated to a sufficient degree such that the ambulator assembly will clear the components of the main drive chassis 12 in order to drop the foot plate 26 into close proximity to the ground. Located on the bottom of foot plate 26 is at least one caster 62 so that the ambulator assembly may be operated in any direction.

Once the seat has been rotated to the desired position, the motor 30 which acts as a means for raising and lowering the seat is activated, and thereby drives drive belts 64 to rotate ball screws 66, which in turn straighten the ambulator leverage arms 68 to bring the ambulator assembly 18 into a standing up position.

Figure 2:
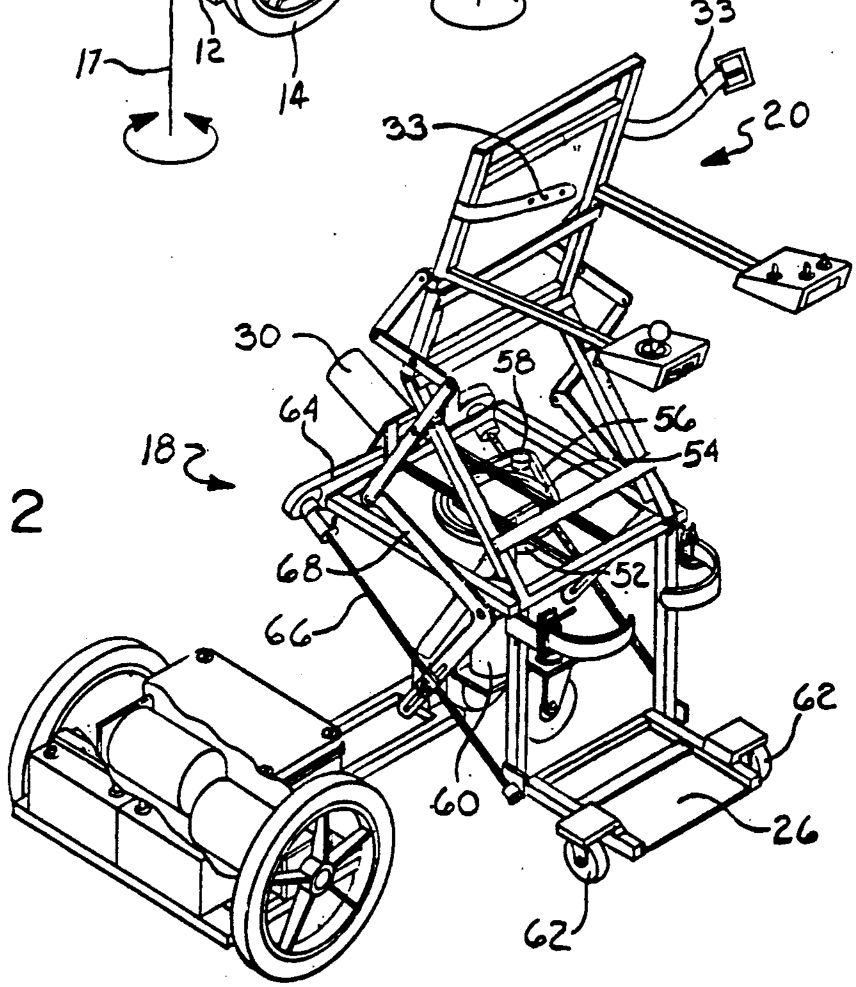
FIG. 2 shows a perspective view of another view of the preferred embodiment of the inventive device where the seat has been removed to show the working mechanism under the seat, in a partially standing position with the seat rotated such that the casters and platform are in close proximity to the ground.

In operation, there are essentially four types of movement available with this stand-up wheelchair. The first type of movement is the back and forth lateral movement of the main drive chassis which propels the wheelchair forward and backward. It is preferred if there are two separate motors attached to each of the front wheels, as shown in FIG. 2, although the wheelchair may be operated mechanically, or with only one drive motor. By having separate motors attached to each of the front wheels, the wheelchair is more maneuverable. The front and rear wheels preferably have independent steering controls.

The second type of movement is the rotation movement of the ambulator assembly on the ambulator frame support. To operate the wheelchair in a standing up position along side the main chassis, the seat is first rotated to about 45° in order to allow the ball screw 66 to be cleared from interference with the main drive chassis. After the seat has been rotated, the entire invalid supporting means can be stood up. For the rotation of the ambulator assembly, the motor can act to place the occupant along side of, behind, or on the other side of the main drive chassis. As can be seen in FIG. 3, the occupant of the wheelchair can be in a standing position behind the main drive chassis, or may rotate around on the caster wheels so that the occupant can be standing in any position rotated around, with the exception of being able to stand upon the motor part of the main part chassis.

Furthermore, as can be seen in FIG. 4, the footplate 26 is held above ground 70 and is supported by casters 62. The footplate 26 may be made of a metal sheet and holds the occupant from about ⅜" to 1½" above the ground level. Preferably, the open space at the back of foot plate 26 as shown in FIG. 2 acts as a recess for the occupant's heel of his or her shoe. In order to rotate around, the heel must be slightly lifted in order not to contact the ground, and the motor actuated before rotating on the casters.

In order to further show the tripod stability of the wheelchair of the present invention, FIGS. 5 and 6 show the interlocking triangular concept of the main drive chassis and the ambulator assembly as they interconnect at their apexes. In FIG. 5, the wheelchair is schematically shown in a sitting down position with the ambulator assembly 18 facing the same forward direction as the main drive chassis 12. With reference again to FIG. 1, one can see that the main drive chassis 12 is attached to wheels 14. The triangular shape of the main drive chassis is formed essentially by the two front wheels 14, in combination with the rear casters 16. The ambulator assembly 18 is of a triangular configuration due to the two casters up front, with the apex being the ambulator frame support 19. As shown in FIG. 6, the ambulator assembly 18 has rotated approximately 180° about the ambulator frame support, schematically giving the same configuration as illustrated in FIG. 3. The interlocked triangular configurations shown in FIGS. 5 and FIGS. 6 illustrate the concept by which the stability of the wheelchair is designed. Although other views have not been included, one of ordinary skill in the art can envision the interim positions for ambulator assembly 18 as it rotates around ambulator frame support 19, which acts as the apex of the interlocking triangles.

The third type of movement involved in the present wheelchair includes the raising and lowering of the invalid supporting means in order to make the occupant stand-up. As described hereinabove, motor 30 activates the drive belts 64 which rotate ball screws 66 to bring the ambulator leverage arms to an upright position. It is anticipated that there will be a backward lean angle of between about 2° and 10° in order to add further stability for the occupant.

The fourth type of movement is the drop and lift movement caused by motor 60 which drops the entire ambulator assembly after it has been rotated to a sufficient angle such that the ball screws will clear the internal workings of the main drive shaft. As can be most clearly seen in FIG. 2, the casters and footplate portion of the invalid supporting means, before rotation, as shown in FIG. 1 are located upward from the floor or ground upon which the main drive chassis is driving. Upon rotation by motor 52, the ball screw 66 clears the main drive chassis, and may then be lowered by motor 60 such that caster 62 will come into contact with the ground as shown in FIG. 4.

After the ambulator assembly has been dropped such that the casters come in contact with the ground, the ambulator assembly may be rotated about the main drive chassis in order to put the occupant into his desired position. The ambulator assembly may be rotated about a 360° circumference around the ambulator assembly axis of rotation 17 as shown in FIGS. 5 and 6.

The wheelchair includes a control means which preferably has a joy stick, speed control, breaking control, rotation control and vertical motion control for controlling all of the above-described types of movement. Because the front and rear wheels include at least a pair of wheels in the front of the device, and at least one rear wheel, steering is generally made easy, as the steering style is that of a high-low device which is currently used in warehouses, etc.

The wheels of the main drive chassis are preferably driven by dc-units, although any other suitable motor may be utilized, if one is used at all. The raising and lower motor preferably includes an electric motor of the type which includes a hydraulic pump and a manual ball screw. If there is no motor, it would be preferable to include a hydraulic lifter which could be manually operated. The rotation motor for rotating the ambulator assembly preferably includes an electric motor which has a mechanism selected from the group consisting of a hydraulic pump, a manual ball screw, or any combination thereof. Again, if no motor is there, a manual rotation system may be incorporated. In order to keep the invalid within the mobility device while in a standing position, there is preferably a stability strap for holding the upper body of the invalid in place. The steering may be controlled by the rear wheel, or the front and rear wheels may have independent steering controls and mechanisms.

Consequently, the stand-up wheelchair of the present invention addresses all of the objects discussed hereinabove by providing a wheelchair which exhibits various types of movements, and by providing a wheelchair which can be rotated about while leaving the occupant in a relatively stable position while maintaining the anthropometer average of the occupant. Because the occupant is able to stand on the footplate while being rotated about, the occupant has nearly simulated normal motion. The footplate is capable of being raised to clear the main drive chassis for rotation, and is also capable of being lowered to the ground once the footplate is rotated clear of the main drive chassis. Therefore, the occupant can experience 360° about the ambulator assembly axis of rotation 17.

While my invention has been described in terms of a specific embodiment, it must be appreciated that other embodiments could readily be adapted by one skilled in the art. Accordingly, the scope of my invention is to be limited only by the following claims.

What is claimed is:

1. An invalid mobility device, comprising:

a main drive chassis having front and rear wheels and a main chassis vertical axis of rotation;

an ambulator assembly rotatably attached to said chassis including an invalid supporting means having a seat which is pivotally mounted to the ambulator assembly, a back portion pivotally mounted to said seat, and a footplate attached to the ambulator assembly for receiving the feet of the invalid, said ambulator assembly having an ambulator assembly vertical axis of rotation spaced from the main chassis vertical axis of rotation;

means for raising and lowering the seat and back portion to thereby raise and lower the invalid from a substantially seated position on the seat to a substantially standing position supported by the footplate;

means for clamping the invalid against the seat and back portion of the invalid supporting means attached to the mobility device for supporting the invalid in the mobility device;

independent drive means connected with the wheels for driving and steering said mobility device;

means attached to the mobility device within reach of the invalid for controlling the speed and direction of movement of the chassis and the ambulator assembly;

rotation means for rotating the ambulator assembly around the ambulator assembly vertical axis of rotation, to place the invalid within easy reach of countertops and work surfaces so that the invalid may stand without a barrier between his body and a countertop or other surface; and at least one caster attached to the footplate so that the footplate may be supported on and movable over the ground by the at least one caster, so that the footplate may be lowered to a close proximity to the ground so that the invalid's hand reach is at a level to enable direct contact with countertops and other work surfaces.

2. The mobility device of claim 1, wherein each of said front wheels is provided with a separate motor means and separate DC drive control unit.

3. The mobility device of claim 1, wherein the wheels are driven by DC-controlled units.

4. The mobility device of claim 1, wherein said ambulator assembly may be rotated about a 360 degree circumference around the ambulator assembly axis of rotation.

5. The mobility device of claim 1, wherein said controlling means includes a joy stick, speed control, braking control, rotation control and vertical motion control.

6. The mobility device of claim 1, wherein said front and rear wheels comprise at least a pair of wheels in the front of the device, and at least one rear wheel.

7. The mobility device of claim 1, wherein said raising and lowering means includes an electric motor including a hydraulic pump and a manual ball screw.

8. The mobility device of claim 1, wherein said rotation means for rotating the ambulator assembly includes an electric motor drive means.

9. The mobility device of claim 1, further comprising stability straps for restraining the invalid within the mobility device while in a standing position.

10. The mobility device of claim 1, wherein the front wheels have independent drive controls.

11. The mobility device of claim 1, further comprising means for raising and lowering the footplate, the footplate capable of being raised to clear the main drive chassis for rotation and capable of being lowered to the ground once the footplate is rotated clear of the main drive chassis.

* * * * *